United States Patent
Qian et al.

(10) Patent No.: US 11,227,147 B2
(45) Date of Patent: Jan. 18, 2022

(54) FACE IMAGE PROCESSING METHODS AND APPARATUSES, AND ELECTRONIC DEVICES

(71) Applicant: BEIJING SENSETIME TECHNOLOGY DEVELOPMENT CO., LTD, Beijing (CN)

(72) Inventors: Chen Qian, Beijing (CN); Quan Wang, Beijing (CN); Fei Wang, Beijing (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 202 days.

(21) Appl. No.: 16/456,738

(22) Filed: Jun. 28, 2019

(65) Prior Publication Data

US 2019/0325200 A1   Oct. 24, 2019

Related U.S. Application Data

(63) Continuation of application No. PCT/CN2018/098999, filed on Aug. 6, 2018.

(30) Foreign Application Priority Data

Aug. 9, 2017  (CN) .......................... 201710677556.8

(51) Int. Cl.
  *G06K 9/00*  (2006.01)
  *G06K 9/34*  (2006.01)
  *G06K 9/62*  (2006.01)

(52) U.S. Cl.
  CPC ........... *G06K 9/00281* (2013.01); *G06K 9/34* (2013.01); *G06K 9/6256* (2013.01); *G06K 9/6262* (2013.01)

(58) Field of Classification Search
  CPC .... G06K 9/00281; G06K 9/34; G06K 9/6256; G06K 9/6262
  See application file for complete search history.

(56) References Cited

U.S. PATENT DOCUMENTS 7,027,054 B1 *  4/2006  Cheiky ................... G06T 13/40
                                                                  345/473
2005/0272517 A1 * 12/2005  Funk .................. A63B 24/0003
                                                                  473/222

(Continued)

FOREIGN PATENT DOCUMENTS

CN      104268591 B  *  9/1920
CN      104268591 A      1/2015

(Continued)

OTHER PUBLICATIONS

First Office Action of the Chinese application No. 201710677556.8, dated Nov. 28, 2019.

(Continued)

*Primary Examiner* — Qun Shen
(74) *Attorney, Agent, or Firm* — Syncoda LLC; Feng Ma

(57) ABSTRACT

A face image processing method includes: segmenting a face in an image to be processed to obtain at least one organ image block; respectively inputting the at least one organ image block into at least one first neural network, where at least two different types of organs correspond to different first neural networks; and extracting key point information of an organ from the respective input organ image block by (Continued)

S100: Segmenting a face in an image to be processed to obtain at least one organ image block S110: Respectively inputting the at least one organ image block into at least one first neural network S120: Extracting key point information of an organ in the respective input organ image block by the at least one first neural network to respectively obtain key point information of at least one corresponding organ of the face the at least one first neural network to respectively obtain key point information of at least one corresponding organ of the face.

20 Claims, 13 Drawing Sheets

(56) References Cited

U.S. PATENT DOCUMENTS

| | | | | |
|---|---|---|---|---|
| 2006/0050933 | A1* | 3/2006 | Adam | G06K 9/00281 |
| | | | | 382/118 |
| 2008/0037836 | A1* | 2/2008 | Chen | G06K 9/00281 |
| | | | | 382/118 |
| 2010/0036943 | A1* | 2/2010 | Hosokawa | G06F 13/00 |
| | | | | 709/224 |
| 2014/0043329 | A1* | 2/2014 | Wang | G06K 9/00201 |
| | | | | 345/420 |
| 2015/0213604 | A1* | 7/2015 | Li | G06K 9/00315 |
| | | | | 345/473 |
| 2015/0242707 | A1* | 8/2015 | Wilf | G06K 9/6256 |
| | | | | 382/159 |
| 2016/0275341 | A1* | 9/2016 | Li | G06K 9/4642 |
| 2018/0158230 | A1* | 6/2018 | Yan | G06T 11/00 |

FOREIGN PATENT DOCUMENTS

| | | |
|---|---|---|
| CN | 105354565 A | 2/2016 |
| CN | 105981041 A | 9/2016 |
| CN | 106909870 A | 6/2017 |
| CN | 108229293 A | 6/2018 |

OTHER PUBLICATIONS

Zhao, Ning, "Automatic Tagging of Facial Feature Points and Expression Generation", Full text database of Chinese excellent master's theses (information technology series) Issue 7, Jul. 15, 2012, pp. 16-20, 25, 32, 39-42, 56 of the text.

Bai, Lixin, "Speaker-identification Algorithm Research based on Lip-features", Full text database of Chinese excellent master's theses (information technology series) Issue 10, Oct. 15, 2014, pp. 28, 33-34 of the text.

Xi Chen etc. "Delving Deep into Coarse-to-fine Framework for Facial Landmark Localization", 2017 IEEE Conference on Computer Vision and Pattern Recognition Workshops, p. 2088-2095.

International Search Report in the international application No. PCT/CN2018/098999, dated Oct. 15, 2018.

A. Bulat and G. Tzimiropoulos. How far are we from solving the 2d & 3d face alignment problem? (and a dataset of 230, 000 3d facial landmarks). CoRR, abs/1703.07332, 2017.

X. Cao, Y. Wei, F. Wen, and J. Sun. Face alignment by explicit shape regression. International Journal of Computer Vision, 107(2):177-190, 2014.

S. Ren, X. Cao, Y. Wei, and J. Sun. Face alignment at 3000 FPS via regressing local binary features. In 2014 IEEE Conference on Computer Vision and Pattern Recognition, CVPR 2014, Columbus, OH, USA, Jun. 23-28, 2014, pp. 1685-1692, 2014.

B. Shi, X. Bai, W. Liu, and J. Wang. Deep regression for face alignment. CoRR, abs/1409.5230, 2014.

Y. Sun, X. Wang, and X. Tang. Deep convolutional network cascade for facial point detection. In IEEE Conference on Computer Vision and Pattern Recognition, pp. 3476-3483, 2013.

* cited by examiner

FACE IMAGE PROCESSING METHODS AND APPARATUSES, AND ELECTRONIC DEVICES

CROSS-REFERENCE TO RELATED APPLICATIONS

The present application is a U.S. continuation application of International Application No. PCT/CN2018/098999 filed on Aug. 6, 2018, which claims benefit of Chinese Patent Application No. 201710677556.8 filed on Aug. 9, 2017. The disclosures of these applications are hereby incorporated by reference in their entirety.

BACKGROUND

Face key points are an indispensable part in many applications such as face recognition. Accurately determining face key points is not only conductive to correcting the relevant position of the face, but also conductive to improving semantic information of the face.

SUMMARY

The present disclosure relates to computer vision technologies, and in particular, to face image processing methods and apparatuses, and electronic devices.

Embodiments of the present disclosure provide technical solutions of face image processing.

A face image processing method is provided according to one aspect of the embodiments of the present disclosure. The method includes: segmenting a face in an image to be processed to obtain at least one organ image block; respectively inputting the at least one organ image block into at least one first neural network, where at least two different types of organs correspond to different first neural networks; and extracting key point information of an organ from the respective input organ image block by the at least one first neural network to respectively obtain key point information of at least one corresponding organ of the face.

A face image processing method is provided according to one aspect of the embodiments of the present disclosure. The method includes: obtaining an image to be processed comprising at least a partial area of a face; and extracting, by a neural network, eyelid line information or lip line information from the image to be processed, wherein the eyelid line information comprises: trajectory information or a fitted line represented by 10-15 key points at a monocular upper eyelid or lower eyelid, and wherein the lip line information comprises: trajectory information or a fitted line represented by 16-21 key points at an upper contour of a single lip and 16-21 key points at a lower contour of the single lip.

A face image processing method is provided according to one aspect of the embodiments of the present disclosure. The method includes: obtaining an image to be processed including at least a partial area of a face; and extracting, by a neural network, eyelid line information from the image to be processed, where the eyelid line information includes: trajectory information or a fitted line represented by 10-15 key points at a monocular upper eyelid or lower eyelid.

A face image processing method is provided according to one aspect of the embodiments of the present disclosure. The method includes: obtaining an image to be processed including at least a partial area of a face; and extracting, by a neural network, lip line information from the image to be processed, where the lip line information includes: trajectory information or a fitted line represented by 16-21 key points at an upper contour of a single lip and 16-21 key points at a lower contour thereof.

A face image processing apparatus is provided according to another aspect of the embodiments of the present disclosure. The apparatus includes: a segmentation module, configured to segment a face in an image to be processed to obtain at least one organ image block; an input module, configured to respectively input the at least one organ image block into at least one first neural network, where at least two different types of organs correspond to different first neural networks; and an organ key point extraction module, configured to extract key point information of an organ from the respective input organ image block by the at least one first neural network to respectively obtain key point information of at least one corresponding organ of the face.

A face image processing apparatus is provided according to another aspect of the embodiments of the present disclosure. The apparatus includes: a second obtaining module, configured to obtain an image to be processed including at least a partial area of a face; and an eyelid line extraction module, configured to extract, by a neural network, eyelid line information from the image to be processed, where the eyelid line information includes: trajectory information or a fitted line represented by 10-15 key points at a monocular upper eyelid or lower eyelid.

A face image processing apparatus is provided according to another aspect of the embodiments of the present disclosure. The apparatus includes: a second obtaining module, configured to obtain an image to be processed including at least a partial area of a face; and a lip line extraction module, configured to extract, by a neural network, lip line information from the image to be processed, where the lip line information includes: trajectory information or a fitted line represented by 16-21 key points at an upper contour of a single lip and 16-21 key points at a lower contour thereof.

An electronic device is provided according to yet another aspect of the embodiments of the present disclosure. The electronic device includes: a memory storing processor-executable instructions; and a processor, configured to execute the stored processor-executable instructions to perform operations of: segmenting a face in an image to be processed to obtain at least one organ image block; respectively inputting the at least one organ image block into at least one first neural network, wherein at least two different types of organs correspond to different first neural networks; and extracting key point information of an organ from the respective input organ image block by the at least one first neural network to respectively obtain key point information of at least one corresponding organ of the face.

An electronic device is provided according to yet another aspect of the embodiments of the present disclosure, including: a memory, configured to store a computer program; and a processor, configured to execute the computer program stored in the memory, where when the computer program is executed, the following instructions are executed: an instruction for segmenting a face in an image to be processed to obtain at least one organ image block; an instruction for respectively inputting the at least one organ image block into at least one first neural network, where at least two different types of organs correspond to different first neural networks; and an instruction for extracting key point information of an organ from the respective input organ image block by the at least one first neural network to respectively obtain key point information of at least one corresponding organ of the face.

An electronic device is provided according to yet another aspect of the embodiments of the present disclosure, including: a memory, configured to store a computer program; and a processor, configured to execute the computer program stored in the memory, where when the computer program is executed, the following instructions are executed: an instruction for obtaining an image to be processed including at least a partial area of a face; and an instruction for extracting, by a neural network, eyelid line information from the image to be processed, where the eyelid line information includes: trajectory information or a fitted line represented by 10-15 key points at a monocular upper eyelid or lower eyelid.

An electronic device is provided according to yet another aspect of the embodiments of the present disclosure, including: a memory, configured to store a computer program; and a processor, configured to execute the computer program stored in the memory, where when the computer program is executed, the following instructions are executed: an instruction for obtaining an image to be processed including at least a partial area of a face; and an instruction for extracting, by a neural network, lip line information from the image to be processed, where the lip line information includes: trajectory information or a fitted line represented by 16-21 key points at an upper contour of a single lip and 16-21 key points at a lower contour thereof.

A non-transitory computer-readable storage medium provided according to yet another aspect of the embodiments of the present disclosure has a computer program stored thereon, where when the computer program is executed by a processor, the steps in the method embodiments of the present disclosure is implemented, for example, segmenting a face in an image to be processed to obtain at least one organ image block; respectively inputting the at least one organ image block into at least one first neural network, where at least two different types of organs correspond to different first neural networks; and extracting key point information of an organ from the respective input organ image block by the at least one first neural network to respectively obtain key point information of at least one corresponding organ of the face;

for another example, obtaining an image to be processed including at least a partial area of a face; and extracting, by a neural network, eyelid line information from the image to be processed, where the eyelid line information includes: trajectory information or a fitted line represented by 10-15 key points at a monocular upper eyelid or lower eyelid; and for still another example, obtaining an image to be processed including at least a partial area of a face; and extracting, by a neural network, lip line information from the image to be processed, where the lip line information includes: trajectory information or a fitted line represented by 16-21 key points at an upper contour of a single lip and 16-21 key points at a lower contour thereof.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
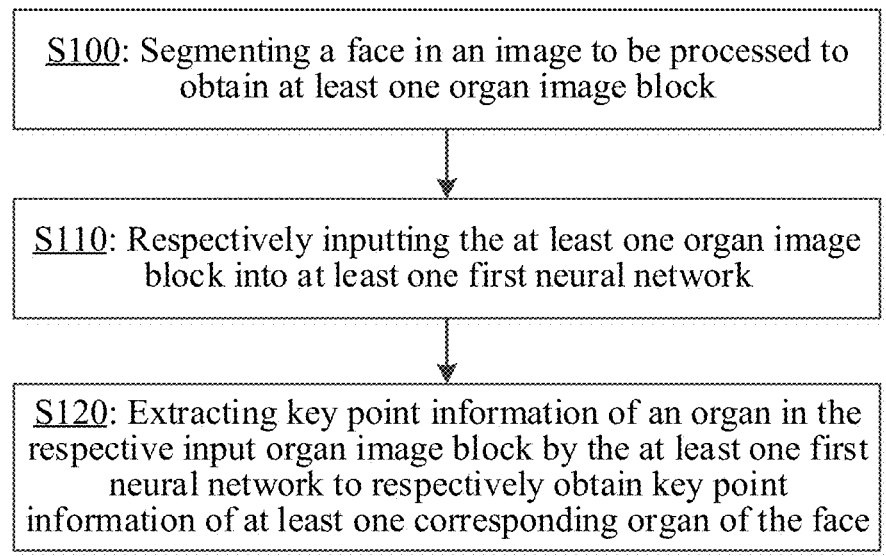
FIG. 1 is a flowchart of an embodiment of a method according to the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, Personal Computer (PC) systems, server computer systems, thin clients, thick clients, handheld or laptop devices, microprocessor-based systems, set top boxes, programmable consumer electronics, network PCs, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, assemblies, logics, data structures, and the like, to perform specific tasks or implement specific abstract data types. The computer systems/servers may be practiced in the distributed cloud computing environments in which tasks are performed by remote processing devices that are linked through a communications network. In the distributed cloud computing environments, the program modules may be located in local or remote computing system storage media including storage devices.

FIG. 1 is a flowchart of an embodiment of a method according to the present disclosure. As shown in FIG. 1, the method according to this embodiment includes: step S100, step S110, and step S120.

S100, a face in an image to be processed is segmented to obtain at least one organ image block.

In an optional example, step S100 is performed by a processor by invoking a corresponding instruction stored in a memory, or is performed by a segmentation module 1000 run by the processor.

In an optional example of the present disclosure, the image to be processed is an image such as a static picture or photo, or a video frame in a dynamic video. The image to be processed may be an image including a face, and the face in the image to be processed is a frontal face or is deflected by a certain angle. In addition, the face in the image to be processed may be high definition, or not so high definition.

In an optional example of the present disclosure, one or two or more organ image blocks are obtained by segmenting the image to be processed, and the organ image block obtained by segmentation in the present disclosure includes, but is not limited to, at least one of an eye image block, an eyebrow image block, or a mouth image block. The eye image block in the present disclosure is a left eye image block, a right eye image block, or a binocular image block. The eyebrow image block in the present disclosure is a left eyebrow image block, a right eyebrow image block, or a double eyebrow image block. The mouth image block in the present disclosure is an upper lip image block, a lower lip image block, or an image block including an upper lip and a lower lip.

In an optional example of the present disclosure, the image to be processed is segmented based on initial face key point information of the image to be processed to obtain at least one organ image block of the face in the image to be processed. For example, in the present disclosure, an area where the left eye, the right eye, or both eyes are located is determined according to an eye key point in the initial face key point information (for differentiation in description, hereinafter referred to as the initial eye key point) of the image to be processed, and the image to be processed is segmented according to the area to obtain an eye image block. For another example, in the present disclosure, an area where the left eyebrow, the right eyebrow, or both eyebrows are located is determined according to an eyebrow key point in the initial face key point information (for differentiation in description, hereinafter referred to as the initial eyebrow key point) of the image to be processed, and the image to be processed is segmented according to the area to obtain an eyebrow image block. For another example, in the present disclosure, an area where the upper lip, the lower lip, or the entire mouth is located is determined according to a mouth key point in the initial face key point information (for differentiation in description, hereinafter referred to as the initial mouth key point) of the image to be processed, and the image to be processed is segmented according to the area to obtain a mouth image block. Optionally, in the present disclosure, the organ image block obtained by segmentation is zoomed in or out (if needed) so that the organ image block obtained by segmentation has a predetermined size, and the predetermined size of the organ image block may be determined according to requirements of a first neural network input, to which the organ image block is input, for an input image block.

In an optional example of the present disclosure, a left eye image block, a right eye image block, and a mouth image block are obtained by segmenting the image to be processed.

In an optional example of the present disclosure, the initial face key point information of the image to be processed includes, but is not limited to, serial number information of an initial face key point and coordinate information of the initial face key point in the image to be processed. Optionally, the number of initial face key points included in the initial face key point information in the present disclosure is usually less than or equal to a set value, for example, the initial face key point information includes 21 or 68 or 106 initial face key points.

In an optional example of the present disclosure, an existing neural network (i.e., a second neural network) is used to extract the initial face key point of the image to be processed and obtain the initial face key point information. In an optional example, the second neural network includes: a face detection deep neural network for detecting a face position and a face key point deep neural network for detecting a face key point. In the present disclosure, the image to be processed is first input into the face detection deep neural network, and the face detection deep neural network outputs face position information (such as face circumscribed box information) of the image to be processed. Then, in the present disclosure, the image to be processed and the face position information are input into the face key point deep neural network. The face key point deep neural network determines an area to be detected in the image to be processed according to the face position information, and performs face key point detection on the image in the area to be detected. Accordingly, the face key point deep neural network outputs face key point information for the image to be processed. The face key point information is the initial face key point information.

S110, the at least one organ image block is respectively input into at least one first neural network.

In an optional example, step S110 is performed by a processor by invoking a corresponding instruction stored in a memory, or is performed by an input module 1010 run by the processor.

In an optional example of the present disclosure, one or two or more first neural networks are provided, and the at least one first neural network is respectively used to extract a particular organ key point from its input image block. Optionally, different types of organs correspond to different first neural networks. That is, if organs in two organ image blocks are of different types (e.g., the eyes and the mouth are of different types), then the two organ image blocks should be provided to two different first neural networks; and if organs in two organ image blocks are of the same type (e.g., the left eye and the right are of the same type), then the two organ image blocks are provided to the same first neural network. The first neural network is a neural network that is pre-trained for a key point information positioning task of an organ of a face in a supervised, semi-supervised, or unsupervised manner. The specific training mode is not limited in the embodiments of the present disclosure. In an optional example, the first neural network is pre-trained in a supervised manner. For example, the first neural network is pre-trained using marking data of an organ of the face. The network structure of the first neural network may be flexibly designed according to the needs of the key point information positioning task, and is not limited in the embodiments of the present disclosure. For example, the first neural network includes, but is not limited to, a convolutional layer, a non-linear Rely layer, a pooling layer, and a fully connected layer, and the more the network layers, the deeper the network. For another example, the network structure of the first neural network is, but not limited to, a structure of a network such as an ALexNet, a Deep Residual Network (ResNet), or a Visual Geometry Group Network (VGGnet).

In an optional example of the present disclosure, a first neural network for eye key point information positioning is provided for an eye image block, and the first neural network may also be referred to as an eye key point information positioning deep neural network, and is pre-trained for an eye key point information positioning task in a supervised, semi-supervised, or unsupervised manner, for example, in an optional example, the first neural network is pre-trained using eye key point information and/or eyelid line-related marking data. A first neural network for lip line positioning is provided for a mouth image block in the present disclosure, and the first neural network may also be referred to as a mouth key point information positioning deep neural network, and is pre-trained for a lip key point information positioning task in a supervised, semi-supervised, or unsupervised manner, for example, in an optional example, the first neural network is pre-trained using lip line-related marking data. As an optional example, a left eye image block and a right eye image block obtained by segmenting the image to be processed are separately input into the eye key point information positioning deep neural network. As an optional example, a left eye image block, or a right eye image block, or a binocular image block obtained by segmenting the image to be processed is input into the eye key point information positioning deep neural network. As an optional example, a mouth image block obtained by segmenting the image to be processed is input into the mouth key point information positioning deep neural network.

It can be understood that image blocks of other organs of the face, such as a left eyebrow image block, a right eyebrow image block, and a nose image block, may also be obtained by segmenting the image to be processed in the present disclosure. Extracting key point information of these image blocks by a neural network pre-trained using eyebrow marking data or nose marking data is not described herein again.

S120, key point information of an organ is extracted from the respective input organ image block by the at least one first neural network to respectively obtain key point information of at least one corresponding organ of the face.

In an optional example, step S120 is performed by a processor by invoking a corresponding instruction stored in a memory, or is performed by an organ key point extraction module 1020 run by the processor.

In an optional example, key point information of an organ extracted by the eye key point information positioning deep neural network from an eye image block includes: eye key point information and/or eyelid line information. The eye key point information includes, for example, eye corner, eye center, or other key point information. The eyelid line information includes trajectory information or a fitted line represented by 10-15 key points at a monocular upper eyelid or lower eyelid, for example, upper eyelid line information and/or lower eyelid line information.

In practical application, it is not the more the key points, the better the system performance. For example, the number of key points is somewhat beneficial to improving the accuracy of describing the eye shape, but it also brings large computational overhead and reduces the computational speed. After comprehensively considering the factors such as the efficiency of the eye key point information positioning deep neural network and the accuracy of describing the eye shape, trajectory information or a fitted line represented by 10-15 key points at a monocular upper eyelid or lower eyelid may be expressed as eyelid line information. The accuracy of the eye shape described by the eyelid line information can meet the needs of various applications having precise requirements for eye shape at present, and is also useful for detecting eye states such as an eye open state and an eye closed state.

It should be specially noted that, in the present disclosure, the intersection point of the upper eyelid line and the lower eyelid line at the inner eye corner is an inner eye corner key point, and the intersection point of the upper eyelid line and the lower eyelid line at the outer eye corner is an outer eye corner key point. The inner eye corner key point may be classified as a key point of the upper eyelid line or a key point of the lower eyelid line. The outer eye corner key point may be classified as a key point of the upper eyelid line or a key point of the lower eyelid line. Definitely, the inner eye corner key point and the outer eye corner key point may also be neither key points of the upper eyelid line nor key points of the lower eyelid line, but exist independently. In addition, the number of organ key points extracted from the left eye image block and the number of organ key points extracted from the right eye image block by the eye key point information positioning deep neural network may be the same.

Figure 2:
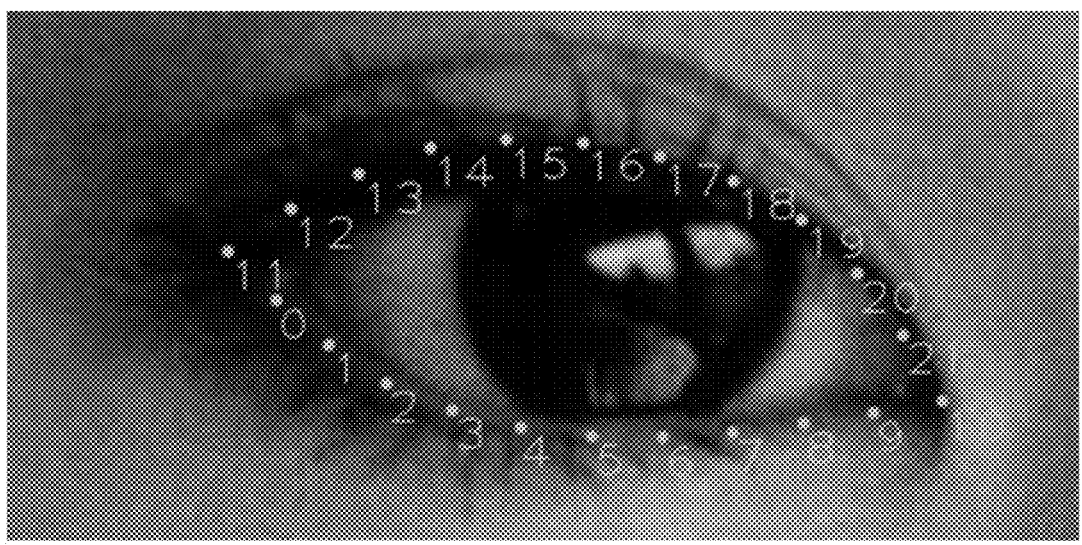
FIG. 2 is a schematic diagram of key points of an eyelid line according to the present disclosure.

In an optional example, as shown in FIG. 2, the key point serial numbered 10 is referred to as an inner eye corner key point, the key point serial numbered 11 is referred to as an outer eye corner key point, the upper eyelid line information is trajectory information or a fitted line represented by the key points serial numbered 11, 12, 13, 14, 15, 16, 17, 18, 19, 20, 21, 10, and the lower eyelid line information is trajectory information or a fitted line represented by the key points serial numbered 11, 0, 1, 2, 3, 4, 5, 6, 7, 8, 9, 10.

In the present disclosure, the number of key points included in the eyelid line information extracted by the eye key point information positioning deep neural network is greater than the number of key points at the eye position included in the initial face key point information. In the present disclosure, a curve A representing the eye shape may be fitted by at least one key point extracted by the eye key point information positioning deep neural network for representing an eyelid line, for example, an upper eyelid line curve or a lower eyelid line curve may be fitted and may be represented as curve A. A curve B representing the eyelid may be fitted by a key point at the eye position in 106 pieces of initial face key point information. By means of actual calculation and detection, the error degree of the curve A in the present disclosure with respect to the curve of the actual eyelid line shape is $1/5$-$1/10$ of the error degree of the curve B with respect to the curve of the actual eyelid line shape. In view of the above, by separately extracting the eyelid line information for the eye image block, the present disclosure can improve the accuracy of describing the eye shape by using the extracted key point information. Generally, the eyes change significantly with a change of a person's face (such as a change in expression). Thus, the technical solution of the present disclosure is beneficial to improving the precision and accuracy of eye key point information extraction, thereby improving the accuracy of subsequent application based on the key point information. For example, in determining a person's facial expression, the eyelid line information may be used as an important reference factor to improve the accuracy of determining the person's facial expression. For another example, when performing image rendering, rendering information such as a sticker may be drawn on the eyes in the image based on the eyelid line and by a computer drawing mode to improve the accuracy of drawing rendering information. For still another example, the image may be subjected to beautifying and/or makeup processing based on the eyelid line to improve the beautifying and/or makeup effect.

In an optional example, organ key points extracted from a mouth image block by the mouth key point information positioning deep neural network generally include: key points of lip lines, for example, key points of the upper lip line and key points of the lower lip line. Optionally, the key points of the upper lip line include: key points of the upper lip line of the upper lip, or key points of the upper lip line of the upper lip and key points of the lower lip line of the upper lip. The key points of the lower lip line include: key points of the upper lip line of the lower lip, or key points of the upper lip line of the lower lip and key points of the lower lip line of the lower lip.

Figure 3:
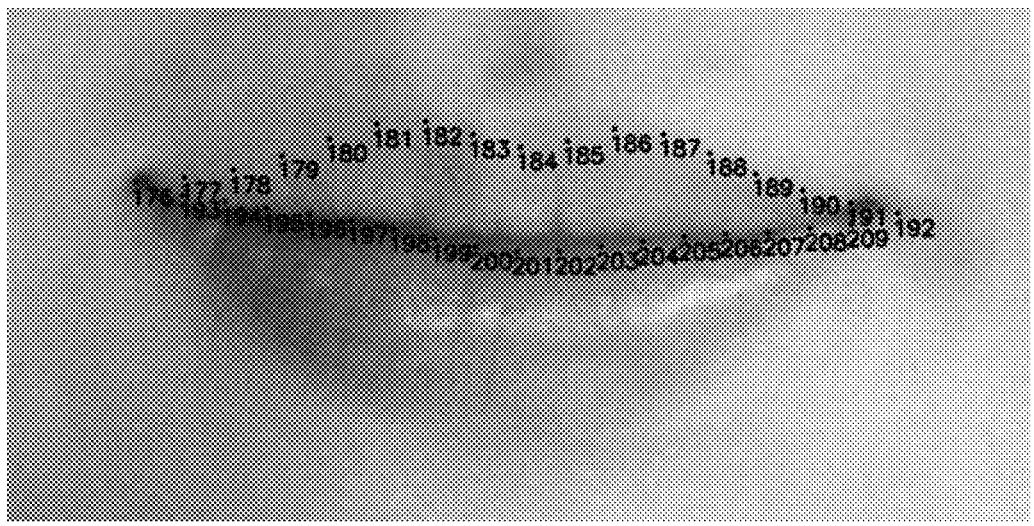
FIG. 3 is a schematic diagram of key points of an upper lip line and a lower lip line of an upper lip according to the present disclosure.
Figure 4:
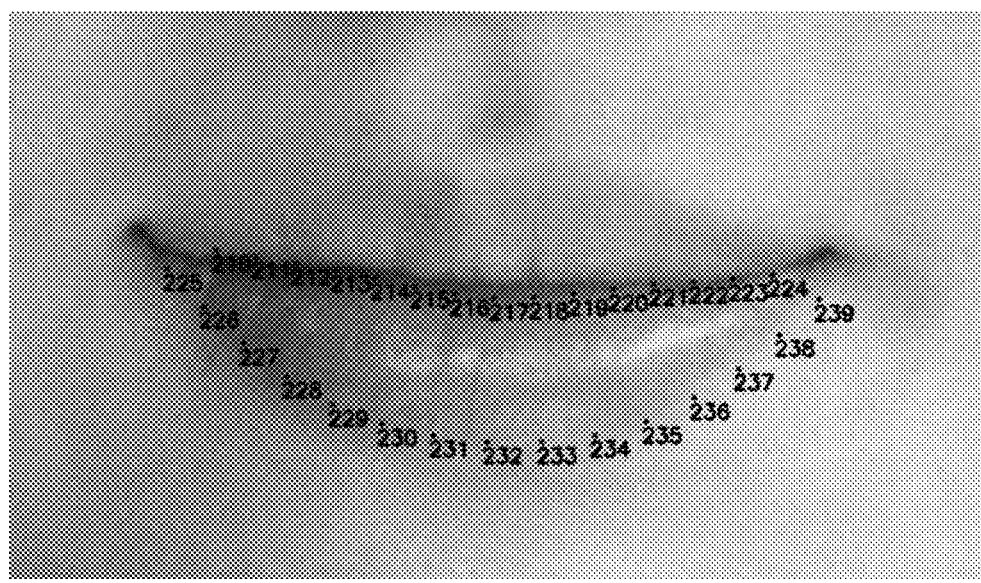
FIG. 4 is a schematic diagram of key points of an upper lip line and a lower lip line of a lower lip according to the present disclosure.

The lip line information in the present disclosure includes, but is not limited to, trajectory information or a fitted line represented by 16-21 key points at an upper contour of a single lip and 16-21 key points at a lower contour thereof. For example, the lip line of the upper lip is trajectory information or a fitted line represented by 16-21 key points at the upper contour of the upper lip together with 16-21 key points at the lower contour of the upper lip, and an optional example is as shown in FIG. 3. For another example, the lip line of the lower lip is trajectory information or a fitted line represented by 16-21 key points at the upper contour of the lower lip together with 16-21 key points at the lower contour of the lower lip, and an optional example is as shown in FIG. 4.

In practical application, it is not the more the number of key points, the better the system performance. For example, the number of key points is somewhat beneficial to improving the accuracy of describing the lip shape, but it also brings large computational overhead and reduces the computational speed. After comprehensively considering the factors such as the efficiency of the deep neural network and the accuracy of describing the lip shape, trajectory information or a fitted line represented by 16-21 key points at an upper contour of a single lip and 16-21 key points at a lower contour thereof may be expressed as lip line information. The accuracy of the lip shape described by the lip line information can meet the needs of various applications having precise requirements for lip shape or mouth state detection at present, and is also useful for detecting mouth open/closed states such as a mouth open state, a yawning state, and a mouth closed state.

It should be specially noted that, in the present disclosure, the intersection points of the upper lip line of the upper lip, the lower lip line of the upper lip, the upper lip line of the lower lip, and the lower lip line of the lower lip at the two mouth corners are two mouth corner key points. Definitely, the two mouth corner key points may not belong to the upper lip line of the upper lip and the lower lip line of the upper lip, or the lower lip line of the lower lip and the lower lip line of the lower lip, but exist independently.

In the present disclosure, the number of key points in the lip line information extracted by the mouth key point information positioning deep neural network is greater than the number of key points at the mouth position included in the initial face key point information. In the present disclosure, a curve C representing the upper lip shape may be fitted by key points of the lip line extracted by the mouth key point information positioning deep neural network, for example, an upper lip line curve of the upper lip and a lower lip line curve of the upper lip may be fitted and form the curve C. A curve D representing the upper lip shape may be fitted by key points at the mouth position in 106 pieces of initial face key point information. By actual calculation, the error degree of the curve C in the present disclosure with respect to the curve of the actual upper lip shape is $\frac{1}{5}$-$\frac{1}{10}$ of the error degree of the curve D with respect to the curve of the actual upper lip shape. In view of the above, by separately extracting key points of the lip line for the mouth image block, the present disclosure may effectively improve the accuracy of describing the lip shape using the extracted key points. Generally, the mouth change significantly with a change of a person's facial expression. Thus, the technical solution of the present disclosure is beneficial to improving the precision and accuracy of lip key point information extraction, thereby improving the accuracy of subsequent application based on the key point information. For example, in determining a person's facial expression, the lip line may be used as an important reference factor to improve the accuracy of determining the person's facial expression. For another example, when performing image rendering, rendering information such as a sticker may be drawn on the lips in the image based on the lip line and by a computer drawing mode to improve the accuracy of drawing rendering information. For still another example, the image may be subjected to beautifying and/or makeup processing based on the lip line to improve the beautifying and/or makeup effect.

In addition to the above eyelid line information and lip line information, the key point information of organs may also include nose key point information, eyebrow key points, eye centers, and the like. In an optional example of the present disclosure, the key point information of the organs of the face obtained may be used in applications such as image rendering of the face, face changing, beautifying processing, makeup processing, face recognition, face state detection, facial expression detection, and face attribute (e.g., attributes such as male/female, age, or nationality) detection. The present disclosure does not limit the specific application range of the obtained key point information of the organs.

Figure 6:
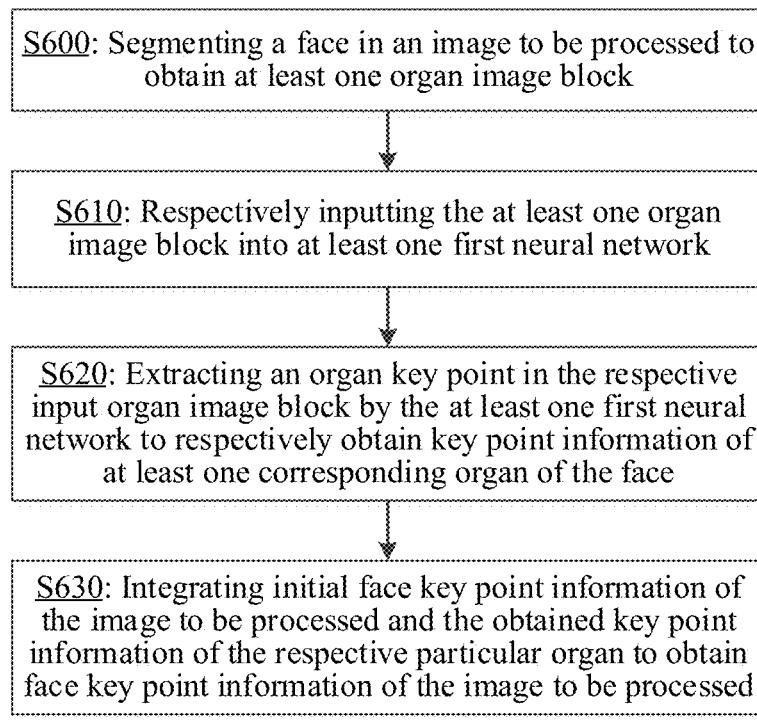
FIG. 6 is a flowchart of an embodiment of a method according to the present disclosure.

FIG. 6 is a flowchart of an embodiment of a method according to the present disclosure. As shown in FIG. 6, the method according to this embodiment includes: step S600, step S610, step S620, and step S630.

S600, a face in an image to be processed is segmented to obtain at least one organ image block. For the content of this step, please refer to the description of step S100 in FIG. 1. Descriptions are not made herein in detail.

In an optional example, step S600 is performed by a processor by invoking a corresponding instruction stored in a memory, or is performed by a segmentation module 1000 run by the processor.

S610, the at least one organ image block is respectively input into at least one first neural network. For the content of this step, please refer to the description of step S110 in FIG. 1. Descriptions are not made herein in detail.

In an optional example, step S610 is performed by a processor by invoking a corresponding instruction stored in a memory, or is performed by an input module 1010 run by the processor.

S620, key point information of an organ is extracted from the respective input organ image block by the at least one first neural network to respectively obtain key point information of at least one corresponding organ of the face. For the content of this step, please refer to the description of step S120 in FIG. 1. Descriptions are not made herein in detail.

In an optional example, step S620 is performed by a processor by invoking a corresponding instruction stored in a memory, or is performed by an organ key point extraction module 1020 run by the processor.

S630, the initial face key point information of the image to be processed and the obtained key point information of the at least one corresponding organ are integrated to obtain face key point information of the image to be processed.

In an optional example, step S630 is performed by a processor by invoking a corresponding instruction stored in a memory, or is performed by an integration module 1040 run by the processor.

In the present disclosure, the initial face key point information and the key point information of the at least one corresponding organ may be integrated by multiple integration modes. Two integration modes are briefly introduced as follows.

A first optional example is a union-based integration mode.

First, the initial face key points of the image to be processed extracted by the second neural network are obtained. For example, the obtained initial face key points are 21 or 68 or 106 initial face key points.

Second, serial numbers and position information of the key points of the eyelid line, the key points of the lip line, and the key points of the eyebrow line are respectively converted. Optionally, the key point information of the eyelid line output by the eye key point information positioning deep neural network usually includes: serial numbers set for a predetermined sequence of the key points of the eyelid line (such as serial number 0 to serial number 21 in FIG. 2), and coordinate information of the key points of the eyelid line in the eye image block. In the present disclosure, the serial numbers may be converted according to the preset sequence of the face key points, for example, converting the serial numbers 0-21 in FIG. 2 to serial numbers 132-153 in FIG. 5. The conversion of the position information in the present disclosure generally refers to: mapping the coordinate information of the key points of the eyelid line in the eye image block to coordinate information of the key points of the eyelid line in the preprocessed image. For conversion of serial numbers and position information of the key points of the lip line and the key points of the eyebrow line, please refer to the above descriptions for conversion of the serial numbers and position information of the key points of the eyelid line. Descriptions are not made herein in detail. In addition, the serial numbers of some or all of the initial face key points are also usually converted in the present disclosure.

Finally, the key point information of the eyelid line, the key point information of the lip line, and the key point information of the eyebrow line having the serial numbers and position information converted are combined with the initial face key point information having the serial numbers converted to form face key point information of the image to be processed, for example, forming 186, 240, 220, or 274 pieces of face key point information.

A second optional example is a partial replacement- or complete replacement-based integration mode.

First, the initial face key points of the image to be processed extracted by the second neural network are obtained. For example, the obtained initial face key points are 21 or 68 or 106 initial face key points.

Second, the serial numbers and position information of the key points of the eyelid line, the key points of the lip line, and the key points of the eyebrow line are respectively converted, and the serial numbers of some or all of the initial face key points are converted, which are optionally as described in the first optional example above. Descriptions are not made herein in detail.

Figure 5:
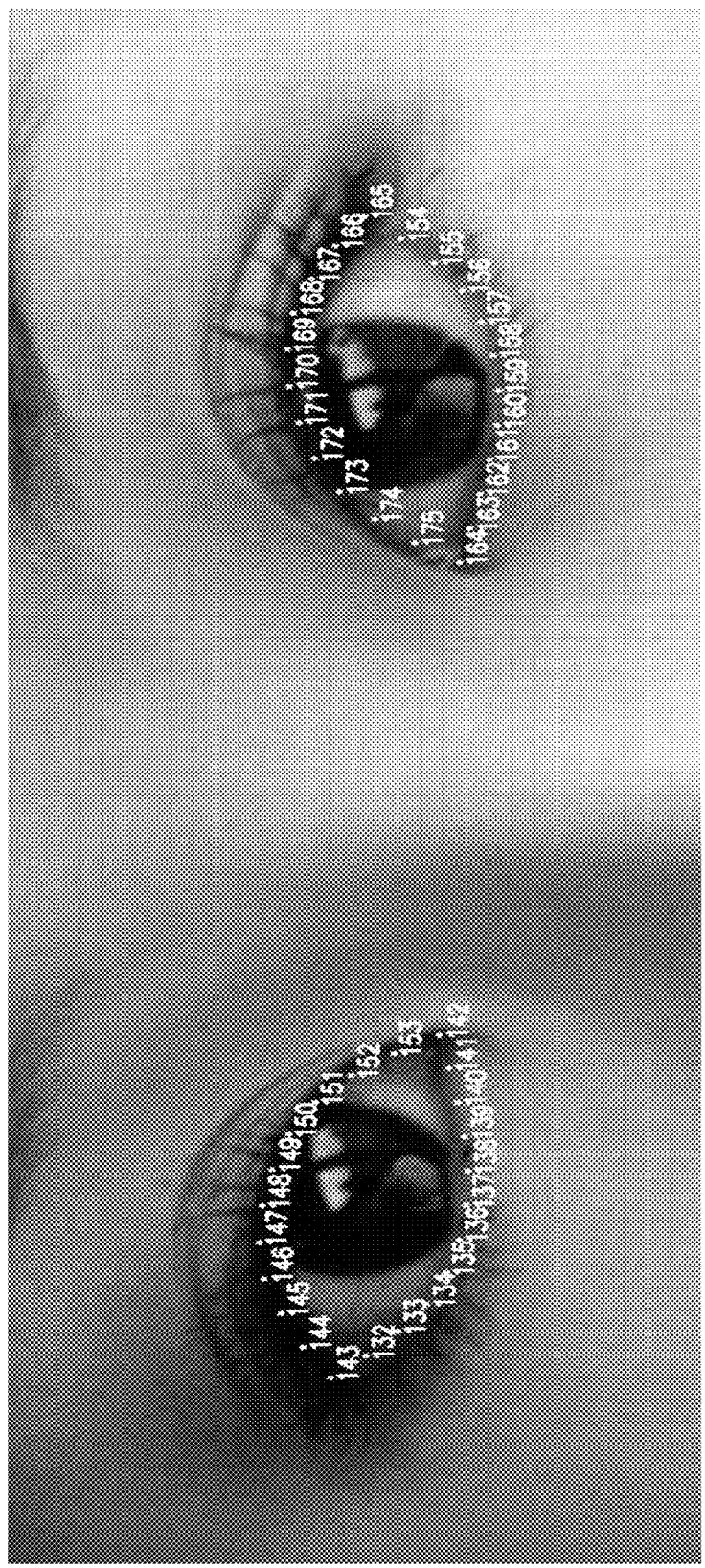
FIG. 5 is a schematic diagram of key points of eyelid lines of both eyes in an image to be processed according to the present disclosure.
Figure 7:
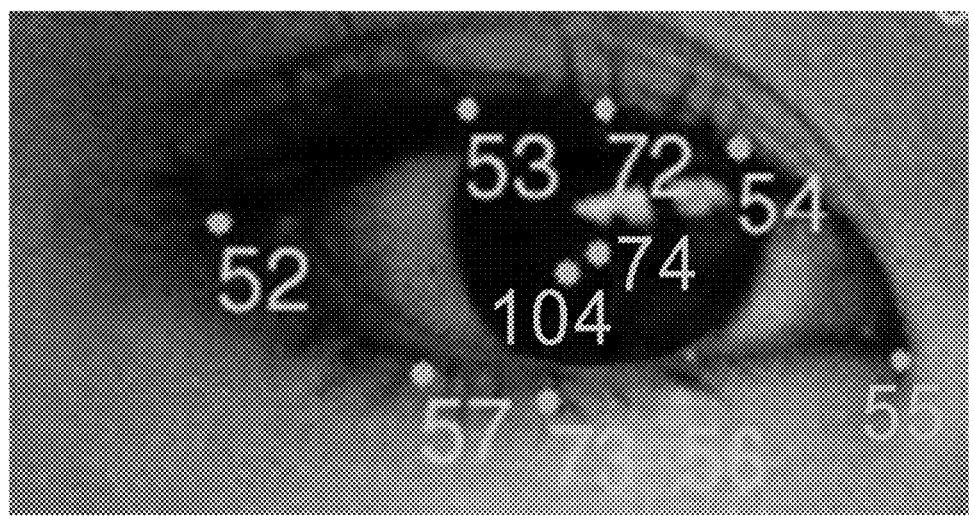
FIG. 7 is a schematic diagram of initial eye key points in initial face key points according to the present disclosure.

Finally, some of the key point information at the eye position in the initial face key point information is replaced with the key point information of the eyelid line having the serial numbers and position information converted, for example, replacing the key point information serial numbered 52-57, 72, and 73 at the eye position in the initial face key point information in FIG. 7 with the key point information serial numbered 132-153 of the eyelid line in FIG. 5. Definitely, in the present disclosure, the key point information at the eye position in the initial face key point information may also be replaced with the key point information of the eyelid line having the serial numbers and position information converted, for example, replacing the key point information serial numbered 52-57, 72-74, and 104 in the initial face key point information in FIG. 7 with the key point information serial numbered 132-153 of the eyelid line in FIG. 5. In the present disclosure, the key point information at the lip position and the eyebrow position in the initial face key point information having the serial numbers converted should also be replaced with the key point information of the lip line and the key point information of the eyebrow line having the serial numbers and position information converted, to form the face key point information of the image to be processed. It can be understood that the key point information serial numbered 52-57, 72-74, and 104 in FIG. 7 may also be retained for locating the eye position, such as for positioning the eye area.

In an optional example, the final face key point information extracted from the image involves more than 106 key points, for example, extracting 186, 240, 220, or 274 key points according to the needs of service applications. In an optional example, the face key point information includes:

1. (48-72 pieces of) eye key point information, including: (4-24) key points for locating the eye position (including key points for positioning the eye area and key points for locating the eyeball position), and (44-48) key points included in the eyelid line information (such as four eyelid lines corresponding to both eyes);

2. (60-84 pieces of) mouth key point information, including: (0-20) key points for locating the mouth position, and (60-64) key points included in the lip line (such as two lip lines corresponding to both lips);

3. (26-58) key points included in the eyebrow area;

4. (15-27) key points included in the nose area; and 5. (33-37) key points of the face contour.

Computational overhead, positioning precision and accuracy can be well balanced using the face key point information with the above amount and proportion, thereby meeting the precise requirements of most service applications.

In an optional example of the present disclosure, the first neural network generally includes an input layer, a plurality of convolutional layers for extracting a feature, and at least one fully connected layer for determining coordinate information of an organ key point in an organ image block, and an output layer. A sample data set for training the first neural network typically includes a plurality of image samples.

Each of the image samples includes a face image. Face key point marking data is marked on each of the image samples. For example, on each of the image samples, serial numbers of more than 106 key points and coordinate information of the key points in the image sample are marked. When training the first neural network, an image sample is first selected from the sample data set, and input to the first neural network. The input layer of the first neural network crops an organ image block, such as an eye image block, or an eyebrow image block, or a mouth image block, from the image sample according to the marking data on the image sample, and adjusts the size of the cropped organ image block. After that, the input layer converts the serial number and coordinate information of at least one key point in the organ image block, so that the serial number, in at least one key point in the entire image sample, of a particular organ key point in the marking data, and coordinate information of the particular organ key point in the image sample are converted into the serial number of the at least one key point in the organ image block and coordinate information in the organ image block. The cropped organ image block having the size adjusted is provided to the convolutional layer for extracting a feature, and the convolutional layer extracts an image feature of the organ image block. Then, the fully connected layer for determining coordinate information of an organ key point in an organ image block determines the serial number of the at least one key point in the organ image block and the coordinate information of the at least one key point according to the extracted image feature, and the output layer of the first neural network outputs multiple groups of data. Each group of data includes the serial number of one key point and the coordinate information of the key point. In the present disclosure, supervised learning may be performed, by using the serial number of the key point and the coordinate information of the key point converted by the input layer, on the multiple groups of data output by the output layer of the first neural network. The above training process is repeated, and when the error of the coordinate information of the at least one key point output by the first neural network meets a predetermined error requirement, the first neural network is successfully trained.

In an optional example of the present disclosure, at least one pieces of organ key point marking data in the image sample is marked by the following process: first, determining a curve control point of a particular organ of the face (such as an upper/lower eyelid line control point of an eye, and an upper/lower lip line control point of the upper/lower lip of the mouth); second, forming a curve according to the curve control point; and next, inserting a plurality of points in the curve by means of interpolation (such as uniform interpolation or non-uniform interpolation), for example, if the curve is a monocular upper or lower eyelid line, inserting 10-15 (e.g., 11) points, for another example, if the curve is an upper/lower lip line of the upper lip of the mouth, inserting 16-21 (e.g., 17) points, and for still another example, if the curve is an upper/lower lip line of the lower lip of the mouth, inserting 16-21 (e.g., 16) points. The coordinate information of the points inserted into the curve in the image sample is coordinate information in the particular organ key point marking data, and the sequence serial numbers of the points inserted into the curve are converted to serial numbers in the particular organ key point marking data in the image sample.

It should be specially noted that, in the present disclosure, the number of points inserted into one curve can be determined according to actual needs, but it should be ensured for the number of points inserted into one curve that: the error degree of a curve fitted by the inserted points with respect to the actual organ curve of the face is $\frac{1}{5}$-$\frac{1}{10}$ of the error degree of the curve formed by the curve control point with respect to the actual organ curve of the face. In view of the above, the shape expressed by the organ key point marking data formed for the image sample can be closer to the actual organ shape in the present disclosure, thereby facilitating the training of the first neural network.

Figure 8:
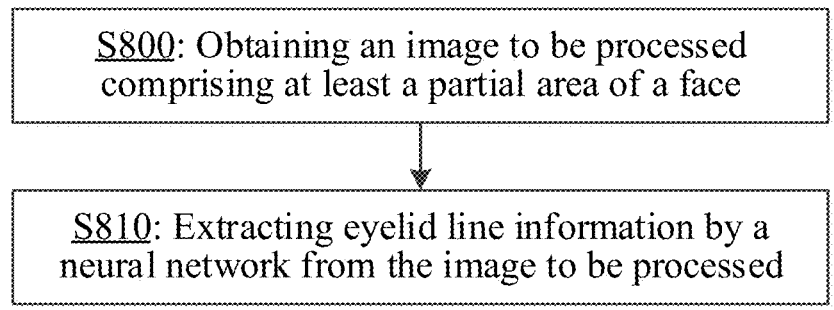
FIG. 8 is a flowchart of an embodiment of a method according to the present disclosure.

FIG. 8 is a flowchart of an embodiment of a method according to the present disclosure. As shown in FIG. 8, the method according to this embodiment includes: step S800 and step S810.

S800, an image to be processed including at least a partial area of a face is obtained.

In an optional example, step S800 is performed by a processor by invoking a corresponding instruction stored in a memory, or is performed by a second obtaining module 1100 run by the processor.

In an optional example of the present disclosure, the image to be processed including at least a partial area of a face is a left eye image, or a right eye image, or a binocular image, or the image to be processed including at least a partial area of a face in the present disclosure is an image including multiple different types of face organs.

In an optional example of the present disclosure, the image to be processed is segmented based on initial face key point information of the image to be processed to obtain a monocular image block or a binocular image block, and the obtained monocular image block or binocular image block becomes an image to be processed that is input to a neural network. In addition, in the present disclosure, the size of the obtained monocular image block or binocular image block may be adjusted, and the monocular image block or binocular image block having the size adjusted becomes an image to be processed that is input to the neural network.

S810, eyelid line information is extracted by the neural network from the image to be processed.

In an optional example, step S810 is performed by a processor by invoking a corresponding instruction stored in a memory, or is performed by an eyelid line extraction module 1110 run by the processor.

In an optional example of the present disclosure, the eyelid line information includes trajectory information or a fitted line represented by 10-15 key points at a monocular upper eyelid or lower eyelid.

In an optional example of the present disclosure, the neural network (i.e., the first neural network described in the above method embodiments) is a neural network trained based on a sample data set. The sample data set for training the neural network includes: eye key point marking data. Optionally, a way to set the eye key point marking data includes: first determining a curve control point of an eyelid line; second, forming a first curve according to the curve control point; and finally, inserting a plurality of points in the first curve by means of interpolation, where information of the inserted points is the eye key point marking data. The error degree of a second curve fitted by the inserted points with respect to the true eyelid line is $\frac{1}{5}$-$\frac{1}{10}$ of the error degree of the first curve with respect to the true eyelid line.

For detailed descriptions of related content, such as the eyelid line information and the training process of the neural network in this embodiment, please refer to the descriptions in the foregoing method embodiments. Descriptions are not made herein in detail.

Figure 9:
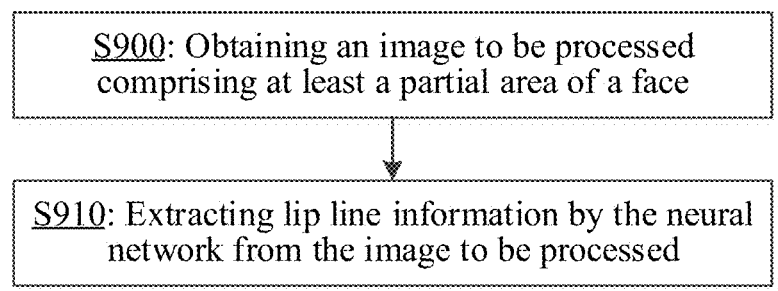
FIG. 9 is a flowchart of an embodiment of a method according to the present disclosure.

FIG. 9 is a flowchart of an embodiment of a method according to the present disclosure. As shown in FIG. 9, the method according to this embodiment includes: step S900 and step S910.

S900, an image to be processed including at least a partial area of a face is obtained.

In an optional example, step S900 is performed by a processor by invoking a corresponding instruction stored in a memory, or is performed by a second obtaining module 1100 run by the processor.

In an optional example of the present disclosure, the image to be processed including at least a partial area of a face is an upper lip image, or a lower lip image, or a mouth image including upper and lower lips, or the image to be processed including at least a partial area of a face in the present disclosure is an image including multiple different types of face organs.

In an optional example of the present disclosure, the image to be processed is segmented based on initial face key point information of the image to be processed to obtain an upper lip image block, or a lower lip image block, or a double lip image block (i.e., a mouth image block including upper and lower lips), and the obtained upper lip image block, or lower lip image block, or double lip image block is used as an image to be processed that is input to a neural network. In addition, in the present disclosure, the size of the obtained upper lip image block, or lower lip image block, or double lip image block may be adjusted, and the upper lip image block, or lower lip image block, or double lip image block having the size adjusted becomes an image to be processed that is input to the neural network.

S910, lip line information is extracted by the neural network from the image to be processed.

In an optional example, step S910 is performed by a processor by invoking a corresponding instruction stored in a memory, or is performed by a lip line extraction module 1200 run by the processor.

In an optional example of the present disclosure, the lip line information includes: trajectory information or a fitted line represented by 16-21 key points at an upper contour of a single lip and 16-21 key points at a lower contour thereof.

In an optional example of the present disclosure, the neural network (i.e., the first neural network described in the above method embodiments) is a neural network trained based on a sample data set. The sample data set for training the neural network includes: mouth key point marking data. Optionally, a way to set the mouth key point marking data includes: first determining a curve control point of a lip line; second, forming a first curve according to the curve control point; and finally, inserting a plurality of points in the first curve by means of interpolation, where information of the inserted points is the mouth key point marking data. The error degree of a second curve fitted by the inserted points with respect to the true 1 line is $1/5$-$1/10$ of the error degree of the first curve with respect to the true lip line.

For detailed descriptions of related content, such as the lip line information and the training process of the neural network in this embodiment, please refer to the descriptions in the foregoing method embodiments. Descriptions are not made herein in detail.

Figure 10:
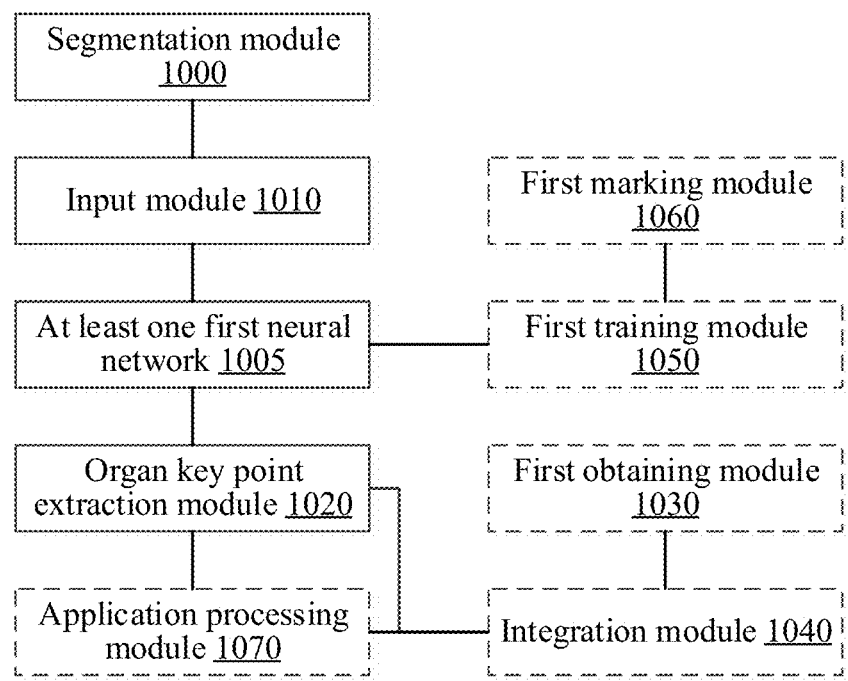
FIG. 10 is a schematic structural diagram of an embodiment of an apparatus according to the present disclosure.

FIG. 10 is a schematic structural diagram of an embodiment of an apparatus of the present disclosure. As shown in FIG. 10, the apparatus in this embodiment includes: a segmentation module 1000, an input module 1010, and an organ key point extraction module 1020. Optionally, the apparatus in this embodiment further includes: a first obtaining module 1030, an integration module 1040, a first training module 1050, a first marking module 1060, and an application processing module 1070.

The segmentation module 1000 is configured to segment a face in an image to be processed to obtain at least one organ image block.

The input module 1010 is configured to respectively input the at least one organ image block into at least one first neural network 1005. At least two different types of organs correspond to different first neural networks.

The organ key point extraction module 1020 is configured to extract key point information of an organ from the respective input organ image block by the at least one first neural network 1005 to respectively obtain key point information of at least one corresponding organ of the face.

The first obtaining module 1030 is configured to obtain initial face key point information of the image to be processed.

The integration module 1040 is configured to integrate the initial face key point information and the key point information of the at least one corresponding organ to obtain face key point information of the image to be processed.

The first training module 1050 is configured to train the first neural network based on a sample data set. The sample data set includes key point marking data of an organ image of the face.

The first marking module 1060 is configured to obtain the key point marking data of the organ image of the face. Operations that the first marking module 1060 may perform include: determining a curve control point of an organ of the face; forming a first curve according to the curve control point; and inserting a plurality of points in the first curve by means of interpolation, where information of the inserted points is the key point marking data.

The application processing module 1070 is configured to perform at least one of the following processing according to the obtained key point information of the particular organ of the face: image rendering of the face, face changing, beautifying processing, makeup processing, face recognition, face state detection, facial expression detection, or attribute detection.

Figure 11:
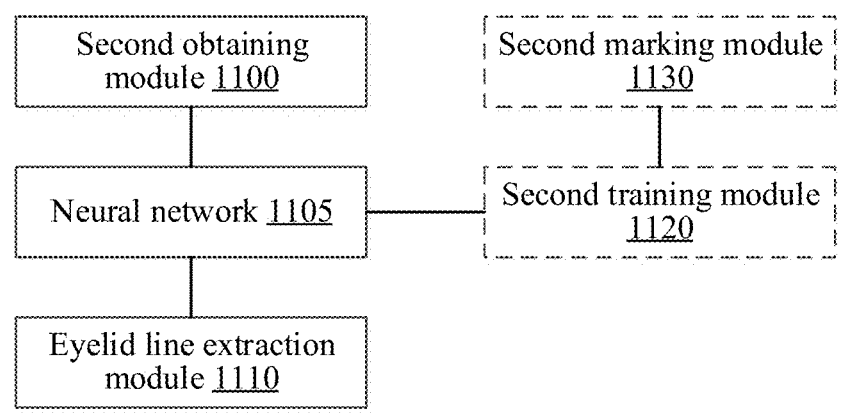
FIG. 11 is a schematic structural diagram of an embodiment of an apparatus according to the present disclosure.

FIG. 11 is a schematic structural diagram of an embodiment of an apparatus of the present disclosure. As shown in FIG. 11, the apparatus in this embodiment includes: a second obtaining module 1100 and an eyelid line extraction module 1110. Optionally, the apparatus further includes: a second training module 1120 and a second marking module 1130.

The second obtaining module 1100 is configured to obtain an image to be processed including at least a partial area of a face.

The eyelid line extraction module 1110 is configured to extract, by a neural network 1105, eyelid line information from the image to be processed, where the eyelid line information includes: trajectory information or a fitted line represented by 10-15 key points at a monocular upper eyelid or lower eyelid.

The second training module 1120 is configured to train the neural network 1105 based on a sample data set, where the sample data set includes eye key point marking data.

The second marking module 1130 is configured to obtain the eye key point marking data. Operations performed by the second marking module 1130 may include: determining a curve control point of an eyelid line; forming a first curve according to the curve control point; and inserting a plurality of points in the first curve by means of interpolation, where information of the inserted points is the eye key point marking data.

Figure 12:
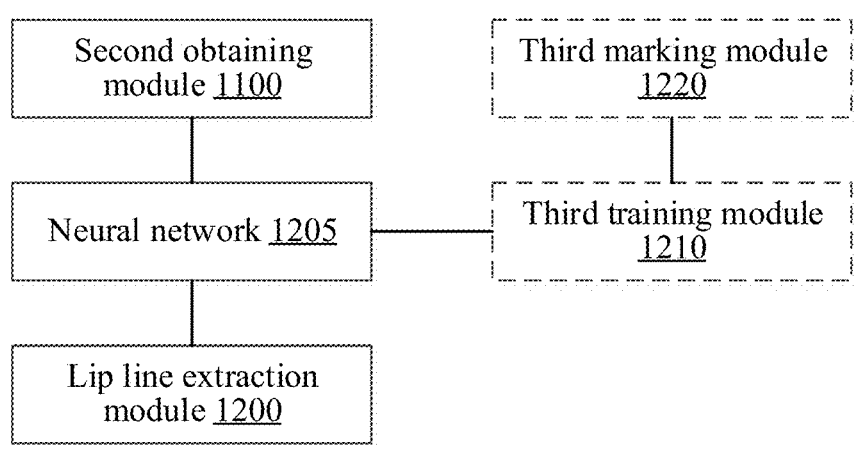
FIG. 12 is a schematic structural diagram of an embodiment of an apparatus according to the present disclosure.

FIG. 12 is a schematic structural diagram of an embodiment of an apparatus of the present disclosure. As shown in FIG. 12, the apparatus in this embodiment includes: a second obtaining module 1100 and a lip line extraction module 1200. Optionally, the apparatus further includes: a third training module 1210 and a third marking module 1220.

The second obtaining module 1100 is configured to obtain an image to be processed including at least a partial area of a face.

The lip line extraction module 1200 is configured to extract, by a neural network 1205, lip line information from the image to be processed, where the lip line information includes: trajectory information or a fitted line represented by 16-21 key points at an upper contour of a single lip and 16-21 key points at a lower contour thereof.

The third training module 1210 is configured to train the neural network based on a sample data set, where the sample data set includes mouth key point marking data.

The third marking module 1220 is configured to obtain the mouth key point marking data. Operations that the third marking module 1220 may perform include: determining a curve control point of a lip line; forming a first curve according to the curve control point; and inserting a plurality of points in the first curve by means of interpolation, where information of the inserted points is the mouth key point marking data.

Reference is made to related descriptions in the foregoing method embodiments for the operations executed by the modules. Descriptions are not made herein in detail.

According to the face image processing methods and apparatuses and the electronic devices provided by the present disclosure, at least one organ image block of a face is extracted from an image to be processed and provided to at least one first neural network in the present disclosure. Since the first neural network in the present disclosure may determine, for the input organ image block, organ key points that are accurate in position and capable of accurately expressing an organ shape requirement, the organ key points obtained by the first neural network in the embodiments of the present disclosure have the characteristic of being accurate in position.

Figure 13:
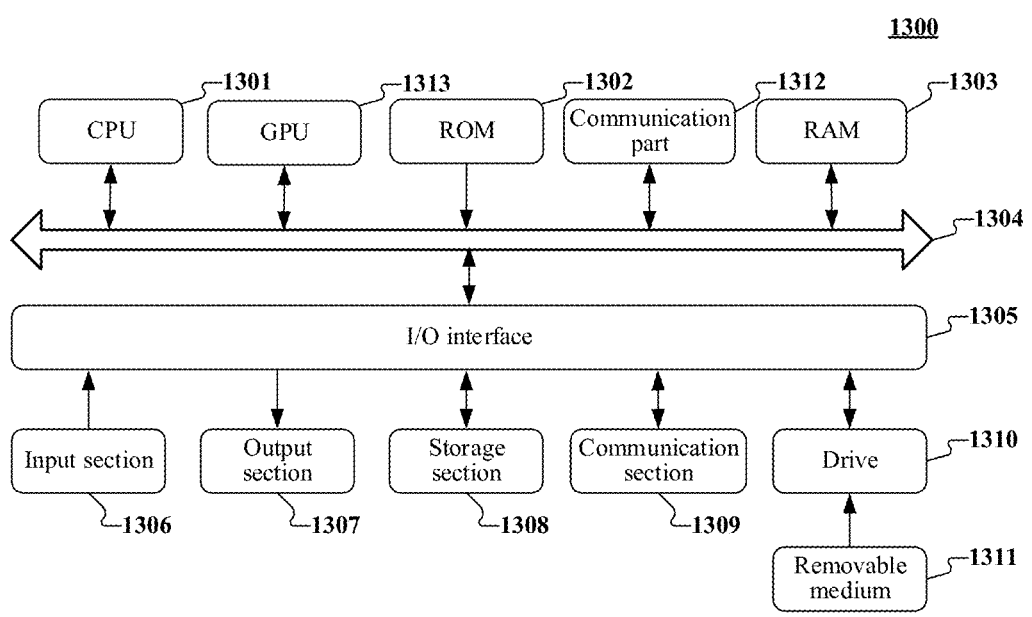
FIG. 13 is a block diagram of an exemplary device according to an embodiment of the present disclosure.

FIG. 13 illustrates an exemplary device 1300 suitable for implementing the present disclosure. The device 1300 is a control system/electronic system configured in an automobile, a mobile terminal (such as a smart mobile phone), a PC (such as a desktop computer or a notebook computer), a tablet computer, or a server. In FIG. 13, the device 1300 includes one or more processors, a communication part, and the like. The one or more processors are, for example, one or more Central Processing Units (CPUs) 1301 and/or one or more Graphic Processing Units (GPUs) 1313, and the processors may perform various appropriate actions and processing according to executable instructions stored in a Read-Only Memory (ROM) 1302 or executable instructions loaded from a storage section 1308 to a Random Access Memory (RAM) 1303. The communication part 1312 may include, but is not limited to, a network card. The network card may include, but is not limited to, an Infiniband (TB) network card. The processor may communicate with the ROM 1302 and/or the RAM 1303, to execute executable instructions. The processor is connected to the communication part 1312 via a bus 1304, and communicates with other target devices via the communication part 1312, thereby implementing corresponding steps in the present disclosure.

In an optional example, instructions executed by the processor include: an instruction for segmenting a face in an image to be processed to obtain at least one organ image block; an instruction for respectively inputting the at least one organ image block into at least one first neural network, where at least two different types of organs correspond to different first neural networks; and an instruction for extracting key point information of an organ from the respective input organ image block by the at least one first neural network to respectively obtain key point information of at least one corresponding organ of the face. The instructions executed by the processor also optionally include: an instruction for obtaining initial face key point information of the image to be processed; an instruction for integrating the initial face key point information and the key point information of the at least one corresponding organ to obtain face key point information of the image to be processed; an instruction for training the first neural network based on a sample data set, where the sample data set includes key point marking data of an organ image of the face; an instruction for obtaining the key point marking data of the organ image of the face, where the instruction for obtaining the key point marking data of the organ image of the face includes: an instruction for determining a curve control point of an organ of the face; an instruction for forming a first curve according to the curve control point; and an instruction for inserting a plurality of points in the first curve by means of interpolation, where information of the inserted points is the eye key point marking data; and an instruction for performing at least one of the following processing according to the obtained key point information of the particular organ of the face: image rendering of the face, face changing, beautifying processing, makeup processing, face recognition, face state detection, facial expression detection, or attribute detection.

In an optional example, the instructions executed by the processor include: an instruction for obtaining an image to be processed including at least a partial area of a face; and an instruction for extracting, by a neural network, eyelid line information from the image to be processed, where the eyelid line information includes: trajectory information or a fitted line represented by 10-15 key points at a monocular upper eyelid or lower eyelid. The instructions executed by the processor also optionally include: an instruction for training the neural network based on a sample data set, where the sample data set includes eye key point marking data; and an instruction for obtaining the eye key point marking data, where the instruction for obtaining the eye key point marking data may include: an instruction for determining a curve control point of an eyelid line; an instruction for forming a first curve according to the curve control point; and an instruction for inserting a plurality of points in the first curve by means of interpolation, where information of the inserted points is the eye key point marking data.

In an optional example, the instructions executed by the processor include: an instruction for obtaining an image to be processed including at least a partial area of a face; and an instruction for extracting, by a neural network, lip line information from the image to be processed, where the lip line information includes: trajectory information or a fitted line represented by 16-21 key points at an upper contour of a single lip and 16-21 key points at a lower contour thereof. The instructions executed by the processor also optionally include: an instruction for training the neural network based on a sample data set, where the sample data set includes mouth key point marking data; and an instruction for obtaining the mouth key point marking data, where the instruction for obtaining the mouth key point marking data may include: an instruction for determining a curve control point of a lip line; an instruction for forming a first curve according to the curve control point; and an instruction for inserting a plurality of points in the first curve by means of interpolation, where information of the inserted points is the mouth key point marking data.

Reference is made to related descriptions in the foregoing method embodiments for the operations executed by the instructions. Descriptions are not made herein in detail.

In addition, the RAM 1303 may further store various programs and data required for operations of an apparatus. The CPU 1301, the ROM 1302, and the RAM 1303 are connected to each other via the bus 1304. In the case that the RAM 1303 exists, the ROM 1302 is an optional module. The RAM 1303 stores executable instructions, or writes the executable instructions into the ROM 1302 during running, where the executable instructions cause the CPU 1301 to execute steps included in the foregoing object segmentation method. An Input/Output (I/O) interface 1305 is also connected to the bus 1304. The communication part 1312 is integrated, or is configured to have multiple sub-modules (for example, multiple IB network cards) separately connected to the bus.

The following components are connected to the I/O interface 1305: an input section 1306 including a keyboard, a mouse and the like; an output section 1307 including a Cathode-Ray Tube (CRT), a Liquid Crystal Display (LCD), a speaker and the like; the storage section 1308 including a hard disk and the like; and a communication section 1309 of a network interface card including an LAN card, a modem and the like. The communication section 1309 performs communication processing via a network such as the Internet. A drive 1310 is also connected to the I/O interface 1305 according to requirements. A removable medium 1311 such as a magnetic disk, an optical disk, a magneto-optical disk, a semiconductor memory or the like is mounted on the drive 1310 according to requirements, so that a computer program read from the removable medium is installed on the storage section 1308 according to requirements.

It should be particularly noted that, the architecture illustrated in FIG. 13 is merely an optional implementation mode. During specific practice, the number and types of the components in FIG. 13 may be selected, decreased, increased, or replaced according to actual requirements. Different functional components may be separated or integrated or the like. For example, the GPU 1313 and the CPU 1301 may be separated, or the GPU 1313 may be integrated on the CPU 1301, and the communication part may be separated from or integrated on the CPU 1301 or the GPU 1313 or the like. These alternative implementations all fall within the scope of protection of the present disclosure.

Particularly, a process described below with reference to a flowchart according to the embodiments of the present disclosure may be implemented as a computer software program. For example, the embodiments of present disclosure include a computer program product. The computer program product includes a computer program tangibly included in a machine-readable medium. The computer program includes a program code for performing steps shown in the flowchart. The program code may include instructions for correspondingly performing steps provided in the present disclosure.

In such implementations, the computer program is downloaded and installed from the network through the communication section 1309, and/or is installed from the removable medium 1311. The computer program, when being executed by the CPU 1301, executes the foregoing instructions described in the present disclosure.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and devices in the present disclosure may be implemented in many manners. For example, the methods and devices in the present disclosure may be implemented with software, hardware, firmware, or any combination of software, hardware, and firmware. The foregoing specific sequence of steps of the method is merely for description, and unless otherwise stated particularly, is not intended to limit the steps of the method in the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A face image processing method, comprising:
segmenting a face in an image to be processed to obtain at least one organ image block;
respectively inputting the at least one organ image block into at least one first neural network, wherein at least two different types of organs correspond to different first neural networks; and
extracting key point information of an organ from the respective input organ image block by the at least one first neural network to respectively obtain key point information of at least one corresponding organ of the face,
wherein before the respectively inputting the at least one organ image block into at least one first neural network, the method further comprises:
training the first neural network based on a sample data set, wherein the sample data set comprises key point marking data of an organ image of the face,
wherein the key point marking data of the organ image of the face is obtained by:
determining a curve control point of an organ of the face;
forming a first curve according to the curve control point; and
inserting a plurality of points in the first curve by means of interpolation, wherein information of the inserted points is the key point marking data.

2. The method according to claim 1, wherein the segmenting a face in an image to be processed to obtain at least one organ image block comprises:

obtaining initial face key point information of the image to be processed; and segmenting the face in the image to be processed according to the initial face key point information to obtain the at least one organ image block, wherein the at least one organ image block comprises at least one of: at least one eye image block, or at least one mouth image block.

3. The method according to claim 1, wherein the method further comprises:

obtaining initial face key point information of the image to be processed; and integrating the initial face key point information and the key point information of the at least one corresponding organ to obtain face key point information of the image to be processed.

4. The method according to claim 3, wherein the obtaining initial face key point information of the image to be processed comprises:

inputting the image to be processed into a second neural network; and extracting, by the second neural network, face key point information of the image to be processed to obtain the initial face key point information.

5. The method according to claim 3, wherein the integrating the initial face key point information and the key point information of the at least one corresponding organ to obtain face key point information of the image to be processed comprises:

replacing at least part of key point information of one organ of the initial face key point information with the key point information of the at least one corresponding organ to obtain the face key point information of the image to be processed, said one organ being the same as the at least one corresponding organ.

6. The method according to claim 3, wherein the integrating the initial face key point information and the key point information of the at least one corresponding organ to obtain face key point information of the image to be processed comprises:

respectively converting a position and a serial number of the key point information of the at least one corresponding organ in the input respective organ image block into a position and a serial number of the key point information of the at least one corresponding organ in the image to be processed.

7. The method according to claim 3, wherein a total number of key points comprised in the face key point information is greater than a total number of key points comprised in the initial face key point information; and/or, a number of organ key points of one organ image block extracted by the first neural network and comprised in the face key point information is greater than a number of organ key points corresponding to the organ image block comprised in the initial face key point information.

8. The method according to claim 7, wherein an error degree of an organ curve fitted by at least two organ key points of the organ image block extracted by the first neural network is 1/10 to 1/5 of the error degree of an organ curve fitted by at least two organ key points corresponding to the organ image block comprised in the initial face key point information, wherein the error degree is an error degree of a fitted curve with respect to an actual organ curve of the face.

9. The method according to claim 2, wherein the key point information of the at least one corresponding organ comprises at least one of: eyelid line information, or lip line information, wherein the eyelid line information comprises: trajectory information or a fitted line represented by 10-15 key points at a monocular upper eyelid or lower eyelid;

the lip line information comprises: trajectory information or a fitted line represented by 16-21 key points at an upper contour of a single lip and 16-21 key points at a lower contour of the single lip.

10. The method according to claim 3, wherein a number of the key points comprised in the initial face key point information is less than or equal to 106, and a number of the key points comprised in the face key point information is greater than 106.

11. The method according to claim 3, wherein the number of the key points comprised in the face key point information is 186, 240, 220, or 274, wherein the face key point information comprises:
4-24 key points for locating the eye position, and 44-48 key points comprised in the eyelid line information;
0-20 key points for locating the mouth position, and 60-64 key points comprised in the lip line;
26-58 key points comprised in an eyebrow area;
15-27 key points comprised in a nose area; and
33-37 key points of the face contour.

12. The method according to claim 1, wherein the error degree of a second curve fitted by the inserted points with respect to the organ curve of the face is 1/10 to 1/5 of the error degree of the first curve with respect to the organ curve of the face, wherein the error degree is an error degree of a fitted curve with respect to an actual organ curve of the face.

13. The method according to claim 1, further comprising:
performing at least one of the following processing according to the obtained key point information of the particular organ of the face: image rendering of the face, face changing, beautifying processing, makeup processing, face recognition, face state detection, facial expression detection, or attribute detection.

14. A non-transitory computer-readable storage medium having stored thereon instructions that, when executed by a processor, cause the processor to perform operations of the face image processing method according to claim 1.

15. A face image processing method, comprising:
obtaining an image to be processed comprising at least a partial area of a face; and
extracting, by a neural network, eyelid line information or lip line information from the image to be processed, wherein the eyelid line information comprises: trajectory information or a fitted line represented by 10-15 key points at a monocular upper eyelid or lower eyelid, and wherein the lip line information comprises: trajectory information or a fitted line represented by 16-21 key points at an upper contour of a single lip and 16-21 key points at a lower contour of the single lip, wherein before the extracting, by a neural network, eyelid line information from the image to be processed, the method further comprises:

training the neural network based on a sample data set, wherein the sample data set comprises eye key point marking data or mouth key point marking data, wherein the eye key point marking data is obtained by:

determining a curve control point of an eyelid line or a lip line;

forming a first curve according to the curve control point; and inserting a plurality of points in the first curve by means of interpolation, wherein information of the inserted points is the eye key point marking data or the mouth key point marking data.

16. The method according to claim 15, wherein the image to be processed is one of a monocular image, a binocular image, a single lip image or a double lip image; or the image to be processed comprises a face image, and the obtaining an image to be processed comprising at least a partial area of a face comprises: segmenting the face in the image to be processed to obtain one of a monocular image block, a binocular image block, a single lip image or a double lip image, wherein one of the monocular image block, the binocular image block, the single lip image block or the double lip image block is the image to be processed comprising at least a partial area of a face.

17. The method according to claim 15, wherein the error degree of a second curve fitted by the inserted points with respect to the eyelid line or the lip line is $1/10$ to $1/5$ of the error degree of the first curve with respect to the eyelid line or the lip line, wherein the error degree is an error degree of a fitted curve with respect to an actual organ curve of the face.

18. An electronic device, comprising:

a memory storing processor-executable instructions; and a processor, configured to execute the stored processor-executable instructions to perform operations of the face image processing method according to claim 15.

19. A non-transitory computer-readable storage medium having stored thereon instructions that, when executed by a processor, cause the processor to perform operations of the face image processing method according to claim 15.

20. An electronic device, comprising:

a memory storing processor-executable instructions; and a processor, configured to execute the stored processor-executable instructions to perform operations of:

segmenting a face in an image to be processed to obtain at least one organ image block;

respectively inputting the at least one organ image block into at least one first neural network, wherein at least two different types of organs correspond to different first neural networks; and extracting key point information of an organ from the respective input organ image block by the at least one first neural network to respectively obtain key point information of at least one corresponding organ of the face, wherein before the respectively inputting the at least one organ image block into at least one first neural network, the operations further comprise:

training the first neural network based on a sample data set, wherein the sample data set comprises key point marking data of an organ image of the face, wherein the key point marking data of the organ image of the face is obtained by:

determining a curve control point of an organ of the face;

forming a first curve according to the curve control point; and inserting a plurality of points in the first curve by means of interpolation, wherein information of the inserted points is the key point marking data.

* * * * *